US006940066B2

(12) United States Patent
Makarov et al.

(10) Patent No.: US 6,940,066 B2
(45) Date of Patent: Sep. 6, 2005

(54) TIME OF FLIGHT MASS SPECTROMETER AND MULTIPLE DETECTOR THEREFOR

(75) Inventors: Alexander Alekseevich Makarov, Cheadle Hulme (GB); Stephen Charles Davis, Macclesfield (GB); Richard Whitney Stresau, Sydney (AU); Kevin Lionel Hunter, Glenhaven (AU); Wayne Leslie Sheils, Baulkham Hills (AU)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 10/478,927

(22) PCT Filed: May 28, 2002

(86) PCT No.: PCT/GB02/02488

§ 371 (c)(1),
(2), (4) Date: Nov. 25, 2003

(87) PCT Pub. No.: WO02/097856

PCT Pub. Date: Dec. 5, 2002

(65) Prior Publication Data

US 2004/0149900 A1 Aug. 5, 2004

(30) Foreign Application Priority Data

May 29, 2001 (GB) .......................................... 0112963

(51) Int. Cl.[7] ............................................ B01D 59/44

(52) U.S. Cl. ..................... 250/287; 250/281; 250/282; 250/293

(58) Field of Search ............................... 250/287, 281, 250/282, 293

(56) References Cited

U.S. PATENT DOCUMENTS

| | | | | |
|---|---|---|---|---|
| 4,691,160 | A | | 9/1987 | Ino |
| 4,851,673 | A | | 7/1989 | Izumi et al. |
| 5,026,988 | A | | 6/1991 | Mendenhall et al. |
| 5,077,470 | A | | 12/1991 | Cody et al. |
| 5,463,219 | A | | 10/1995 | Buckley et al. |
| 5,644,128 | A | | 7/1997 | Wollnik et al. |
| 5,644,220 | A | | 7/1997 | Urs et al. |
| 5,777,326 | A | | 7/1998 | Rockwood et al. |
| 5,898,173 | A | * | 4/1999 | Franzen ..................... 250/287 |
| 6,011,259 | A | | 1/2000 | Whitehouse et al. |
| 6,229,142 | B1 | | 5/2001 | Bateman et al. |
| 6,348,688 | B1 | * | 2/2002 | Vestal ....................... 250/287 |
| 6,559,444 | B2 | * | 5/2003 | Franzen ..................... 250/293 |
| 6,646,252 | B1 | | 11/2003 | Gonin |
| 2002/0175292 | A1 | | 11/2002 | Whitehouse et al. |

FOREIGN PATENT DOCUMENTS

| | | |
|---|---|---|
| EP | 0597667 A | 5/1994 |
| GB | 0907511 | 10/1962 |
| GB | 1147667 | 4/1969 |
| GB | 2246468 | 1/1992 |
| WO | WO98/21742 | 5/1998 |
| WO | WO 98/40907 | 9/1998 |
| WO | WO 99/38190 | 7/1999 |
| WO | WO 99/38191 | 7/1999 |
| WO | WO 99/67801 | 12/1999 |

OTHER PUBLICATIONS

Kristo et al., "System for Simultaneous Count/Current Measurement with a Dual–Mode Photon/Particle Detector", Review of Scientific Instruments, American Institute of Physics, US, vol. 59, No. 3, Mar. 1988, pp. 438–442.

* cited by examiner

*Primary Examiner*—Nikita Wells
*Assistant Examiner*—Zia R. Hashmi
(74) *Attorney, Agent, or Firm*—Haynes and Boone LLP

(57) ABSTRACT

An ion detection arrangement 140 for a time-of-flight (TOF) mass spectrometer 10 includes a beam splitter formed as a mesh 150 at the end of the TOF acceleration and detection chamber 110. Ions enter the detection arrangement through a common entrance window and are then divided by the beam splitter. Those ions striking the mesh 150 generate secondary electrons 160 which are detected by a microchannel plate forming a first detector 170. Those ions passing through the ion beam splitter are detected directly by a second detector 190 also formed from a microchannel plate.

The two detectors are each connected to a corresponding data acquisition system 180, 200 and the data obtained by each are combined to generate a mass spectrum. The problems of detector saturation are thus avoided.

31 Claims, 6 Drawing Sheets

TIME OF FLIGHT MASS SPECTROMETER AND MULTIPLE DETECTOR THEREFOR

FIELD OF THE INVENTION

The invention relates to a time of flight mass spectrometer (TOFMS) and in particular to a detector arrangement having a plurality of detectors for TOFMS.

BACKGROUND OF THE INVENTION

Time of flight mass spectrometry (TOFMS) allows the rapid generation of wide range mass spectra. TOFMS is based upon the principle that ions of different mass to charge ratios travel at different velocities such that a bunch of ions accelerated to a specific kinetic energy separates out over a defined distance according to the mass to charge ratio. By detecting the time of arrival of ions at the end of the defined distance, a mass spectrum can be built up.

Most TOFMS operate in so-called cyclic mode, in which successive bunches of ions are accelerated to a kinetic energy, separated in flight according to their mass to charge ratios, and then detected. The complete time spectrum in each cycle is detected and the results added to a histogram.

One of the primary challenges in TOFMS is to maximize the dynamic range of the device. This is primarily constrained by the processing of the signal from the ion detectors: not only must the number of ions arriving be counted, but also the time at which the ions arrive. This data must be obtained and output before the next set of data can be processed.

The earliest TOFMS devices employed analog to digital converters (ADC) to digitize the output of a DC amplifier connected to a collector electrode. The collector electrode in turn received electrons generated by one or more micro-channel plate electron multipliers when ions impinged thereon. The output of the ADC was coupled to a charge recorder or oscilloscope and, subsequently, a transient recorder.

Although ADC data acquisition systems do not suffer from the drawbacks of time to digital converters (TDC) (see below), their dynamic range is limited by the non-linearity of the electron multiplier and also by the speed of the ADC itself. Even a fast ADC (<5 ns sampling rate), forming a first part of a transient recorder, has a limited dynamic range, and becomes complex, expensive and problematic at the highest mass accuracies demanded. Also, signal variations on the ADC reduce the mass accuracy of the mass spectrometer.

Time to digital converters (TDC) employ ion counting techniques to allow a mass spectrum to be generated. Here, the impact of a single ion is converted to a first binary value e.g. 1 and the lack of impact is represented as a second binary value (e.g. 0). These data can then be processed via various timers and/or counters.

The advantage of a TDC over the analogue detection technique described above is that the signal output from the electron multiplier in respect of each ion impact is treated identically so that variations in the electron multiplier output are eliminated. There is, however, a limit to the dynamic range of a TDC detector, caused by a so-called dead time associated with ion detection. The dead time occurs immediately following the impact of an individual ion. If a subsequent ion arrives during this dead time, it is not recorded. Thus, at higher ion densities, the total of ions arriving may be significantly more than the number actually detected.

Several techniques have been proposed in recent years to address the problems inherent with ADC and TDC ion detection techniques. WO-A-98/40907 discloses an integrated TDC/ADC data acquisition system for TOFMS. A logarithmic (analogue) amplifier is arranged in parallel with a TDC and also an integrating transient recorder. The TDC can collect data and analyse it in respect of very small ion concentrations whilst the transient recorder is able to collect and analyse data in respect of much higher ion concentrations without saturation. The dynamic range of the data acquisition system overall is thus much larger than that of a traditional TDC without sacrificing sensitivity at lower ion concentrations. However, the problems characteristic of ADC detectors identified above still remain at higher ion concentrations.

Another arrangement is disclosed in an article by Kristo and Enke, in Rev. Sci. Instrum. (1988) vol. 59/3, pages 438–442. The arrangement comprises two channel type electron multipliers in series, together with an intermediate anode. The intermediate anode intercepts the majority of electrons generated by the first multiplier and allows these minority of electrons which are not intercepted to be captured by the second electron multiplier. An analog amplifier generates a first detector output from the anode, and a discriminator and pulse counter generates a second detector output from the second electron multiplier. The outputs of the two detectors are then combined. This technique also suffers from the problems associated with a combined TDC/ADC system.

An alternative approach to the issues of sensitivity and dynamic range is set out in WO-A-98/21742. Here, an array of adjacent but separate equal area anodes is employed, with a separate TDC for each anode. This allows parallel processing of incoming ions, to increase the number of simultaneously arriving ions that are detected and thus to increase the dynamic range. The problem with this, of course, is that increases in the number of detectors increases the cost and, on average, an array of N detectors can only increase the total number of ions detected by a maximum of N times.

To address this, WO-A-99/67801 discloses the use of two anodes of unequal area. This extend the dynamic range of the detector since, with large numbers of a particular ion specie arriving at the detector, the average number of ions detected on the smaller anode is small enough to reduce the effects of saturation. The larger anode, by contrast, can detect ions arriving with a lower concentration without an unacceptable loss of accuracy.

WO-A-99/38190 and WO-A-99/38191 also each disclose a microchannel plate electron multiplier having collection electrodes (anodes) with different surface areas.

Such multiple detector techniques suffer from drawbacks, nevertheless. Firstly, physical cross-talk between the channels is inevitable. Due to the spatial spread of electron clouds created by the electron multipliers, only a part of the cloud may be collected on the smaller anode; similarly partial carry-over of electron clouds from the larger collector can take place. In addition, the close proximity of the anodes causes capacitive coupling between each which in turn increases the likelihood of electronic cross-talk. The multiplier voltage may collapse when very intense ion pulses are received, as is possible in, for example, ICP/MS and GC/MS. This results in reduced sensitivity for subsequent mass peaks. Finally, the ratio of "effective areas" may depend heavily on parameters of the incoming ion beam (which in turn may depend upon space charge, ion source conditions etc.) which leads to a mass dependence upon the ratio. This problem is particularly pronounced in narrow ion beams such as are produced in orthogonal acceleration TOFMS.

U.S. Pat. No. 5,777,326 addresses the last problem outlined above by employing a multitude of similar collectors after a common multiplier. Each collector is connected to a separate TDC channel. Whilst the solution provided by U.S. Pat. No. 5,777,326 does largely remove the mass dependence upon the ratio of anode areas, it fails to address the other problems with this multiple detector arrangement and also extends dynamic range only by a factor equal to the number of channels. Thus, the construction can become complex and even then may not be adequate for certain applications such as gas chromatography/mass spectrometry (GC/MS).

It is an object of the present invention to address the problems of the prior art.

According to a first aspect of the present invention, there is provided an ion detection arrangement for a time-of-flight mass spectrometer comprising: an ion beam splitter arranged to intercept a first part of an incident bunch of ions which has passed through the time-of-flight mass spectrometer, but to allow passage of a second part of that incident bunch of ions; a first detector means arranged to detect ions incident upon the ion beam splitter; and a second detector means arranged to detect those ions which pass through the said ion beam splitter.

The detector of the invention accordingly provides a multiple detector wherein ions that have passed through a TOFMS enter into the detector arrangement through a common entrance window and are then divided by an ion beam splitter such as a conversion dynode or grid. Those ions striking the ion beam splitter generate, in the preferred embodiment, secondary electrons which are detected by a first detector means, whereas those ions passing through the ion beam splitter are detected by a second detector means. The ions are accordingly divided at an early stage in their detection, and the multiple detector arrangement accordingly provides greatly reduced electronic and physical cross-talk between the detectors. The dynamic range is extended without sacrifice of linearity, and better quantitation is available.

Preferably, the ion beam is divided by the ion beam splitter in an unequal proportion such that the vast majority of ions entering the multiple detector arrangement are either intercepted by the ion beam splitter, or, alternatively, the vast majority of ions are not intercepted by the ion beam splitter.

It is preferable that the ion beam is divided into two unequal parts so that one of the detectors continues to operate even when the other is saturated. In preferred embodiments, greater than 90% of the ion beam is allowed to pass through the ion beam splitter which may be, for example, a grid or mesh. Alternatively, less than 10% of the ion beam may pass through the ion beam splitter so that more than 90% is intercepted by it. The latter arrangement is particularly preferred because it is easier to manufacture than a largely transparent grid. Also, the latter arrangement allows secondary electrons which may be generated when the ion beam strikes the beam splitter to be focussed in time of flight as they pass towards the first detector means. Electrons are typically easier to focus than incoming ions because electrons are relatively much lighter and faster than ions so that TOF spreading is correspondingly smaller.

It is preferable that the ion beam splitter is arranged to split the incoming ion beam in such a way that each detector detects ions from multiple points uniformly spread over the width of the incoming ion beam. It is desirable that a representative sample of ions is extracted from across the beam width, not just from one particular point.

According to a second aspect of the present invention, there is provided a method of detecting the time of flight of ions in an ion beam of a time-of-flight mass spectrometer, comprising: directing ions to be detected through the time-of-flight mass spectrometer and toward an ion beam splitter; intercepting a first portion of the ions in the ion beam at the ion beam splitter; allowing passage of a second portion of the ions in the ion beam through the ion beam splitter; detecting ions intercepted by the ion beam splitter with a first detector means; and detecting ions passing through the ion beam splitter with a second detector means.

Further advantageous features are set out in the dependent claims which are appended hereto.

BRIEF DESCRIPTION OF THE DRAWINGS

The invention may be put into practice in a number of ways, and some embodiments will now be described by way of example only and with reference to the accompanying drawings, in which.

DETAILED DESCRIPTION OF PREFERRED EMBODIMENTS

Figure 1:
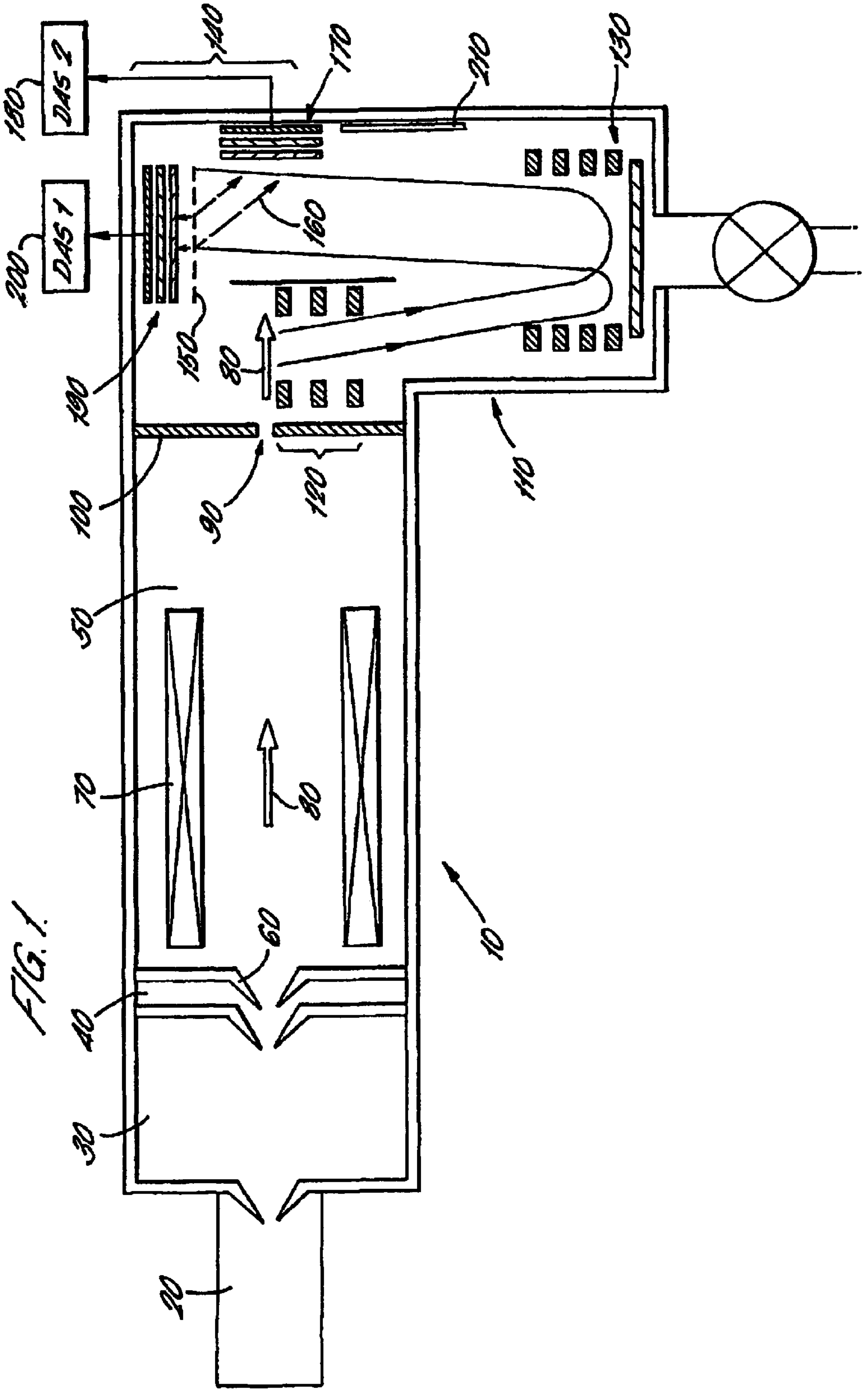
FIG. 1 is a schematic diagram of a time-of-flight mass spectrometer including a multiple detector representing a first embodiment of the present invention.

FIG. 1 shows, in schematic terms, a time-of-flight mass spectrometer (TOFMS) 10. The TOFMS comprises an ion source shown as a representative block 20 in FIG. 1. The ion source may be any suitable continuous or pulsed source, such as an electrospray source, an electron impact source or the like. Indeed, the ion source 20 may in fact be an upstream stage in an ms/ms analysis, e.g. a quadrupole mass spectrometer or an ion trap.

Gaseous particles from the ion source 20 enter an extraction chamber 30 which is evacuated to a first pressure below atmospheric pressure by a vacuum pump (not shown). The ions exit the extraction chamber 30 into an intermediate chamber 40 which is likewise evacuated, but to a lower pressure than the pressure within the extraction chamber 30, by a second vacuum pump, again not shown. The ions then leave the intermediate chamber 40 and enter a focussing chamber 50 through a conical inlet aperture 60. The focussing chamber 50 contains a series of rods 70 which reduce interferences from unwanted species and focus the ions so as to reduce the energy spread thereof. Although a quadrupole rod arrangement is shown in FIG. 1, it will be appreciated that hexapole arrangements can likewise be employed for this purpose.

The rods 70 cause an ion beam 80 to be formed in the focussing chamber 50 and this passes towards an orifice 90 in a wall 100 at the end of the focussing chamber axially distal from the inlet aperture 60 thereof. As with the extraction and intermediate chambers 30, 40, the focussing chamber 50 is evacuated to a third pressure still lower than the pressure within the intermediate chamber 40 by a further vacuum pump (again, not shown).

The ion beam 80 passes through the orifice 90 in the wall 100 and into an acceleration and detection chamber 110. The acceleration and detection chamber 110 which is shown in FIG. 1 contains an orthogonal ion accelerator arrangement 120 which acts as an ion pusher. Specifically, ions in the ion beam 80, which are travelling along a first axis upon entering the acceleration and detection chamber 110, are pushed in a generally orthogonal direction by the orthogonal ion acceleration arrangement 120. The result of this arrangement is that bunches of ions are repeatedly extracted from the ion beam 80 and sent through the acceleration and detection chamber 110 towards a detector arrangement. As will be apparent to the skilled reader, the ion bunches travel through the acceleration and detection chamber at a velocity which is related to the mass-to-charge ratio of the ions. Assuming that a constant electric field is generated by the orthogonal ion acceleration arrangement 120, and that the energy this imparts is converted to kinetic energy, it may be shown that the ion velocity, v, is inversely proportional to the square root of the mass-to-charge ratio.

Again as will be familiar to those skilled in the art, a reflector array 130 may be employed within the acceleration and detection chamber 110 to effectively double the distance travelled by the ion bunches, and thus to allow better spatial separation of the ions of differing mass-to charge ratios within separate bunches.

The ions arrive at a detector arrangement 140 where they are detected in a manner to be described in greater detail below. The time of flight of the ions is in particular determined, and from this a mass spectrum can be built up.

Figure 2:
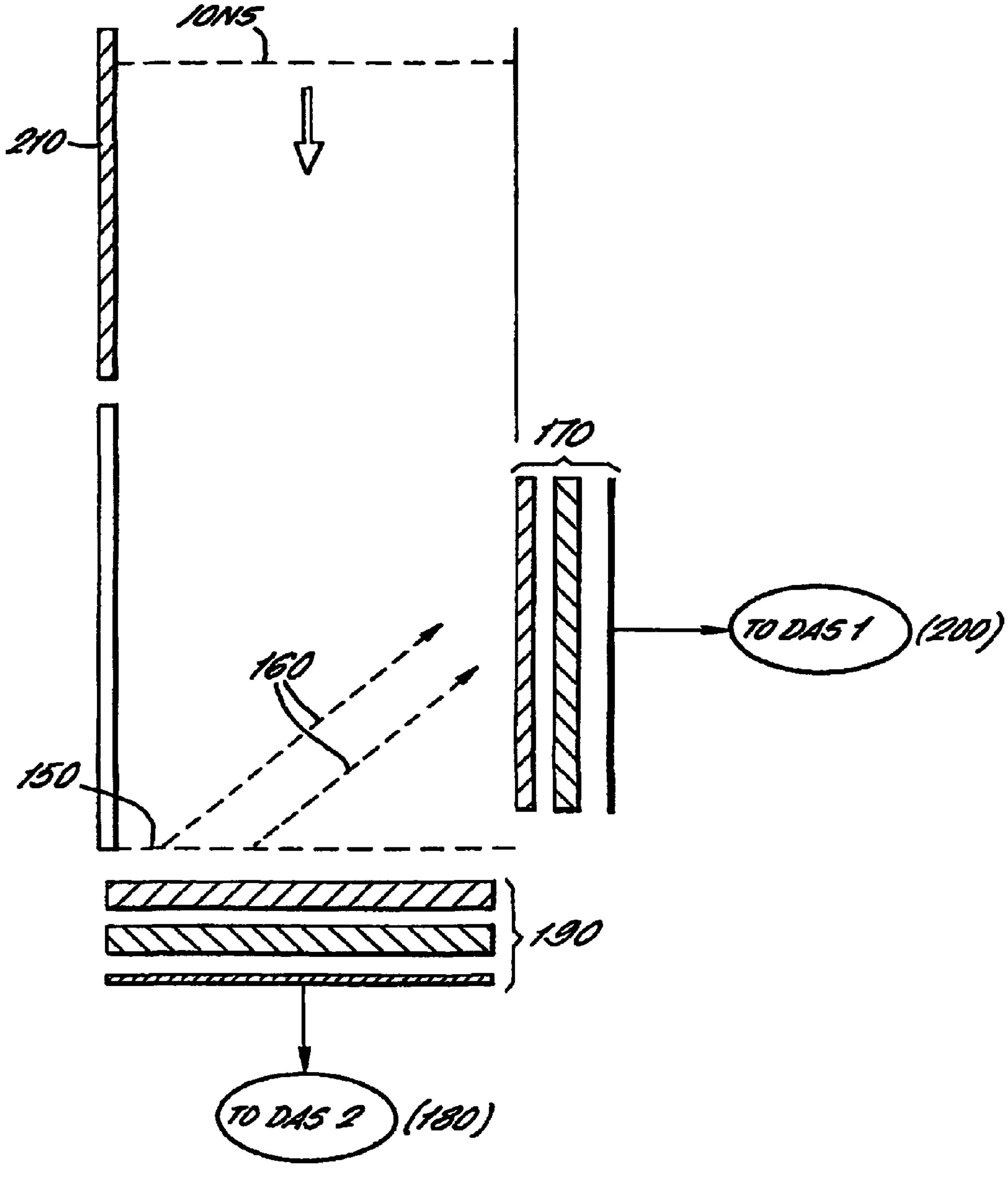
FIG. 2 shows, in more detail, the multiple detector shown in the time of flight mass spectrometer of FIG. 1.

Referring now also to FIG. 2, the details of the detector arrangement 140 are shown. The detector arrangement 140 comprises a grid or mesh 150 formed, for example, from stainless steel, nickel or berillium bronze with apertures created by electrochemical etching. Ions arrive at the grid or mesh 150 through a common entrance window to the detector arrangement 140 and some of the ions strike the mesh itself. Those ions which do not strike the mesh pass through it. In this manner, the grid or mesh 150 acts as an ion beam splitter.

Those ions from the incident ion beam which strike the grid or mesh 150 generate secondary electrons 160 which are registered by a first detector 170. In the arrangement of FIGS. 1 and 2, this first detector comprises a micro-channel plate which is a composite electron multiplier. The secondary electrons 160 which strike the first detector 170 are accumulated and then sent to a second data acquisition system 180. This data acquisition system may be a TDC, an ADC or a combination of the two, as is disclosed in the above-referenced WO-A-98/40907, whose contents are incorporated herein by reference in their entirety.

Those ions which do not strike the grid or mesh 150 pass through it and are then incident upon a second detector 190 which, in the embodiment shown in FIGS. 1 and 2, is again a micro-channel plate. The resultant secondary electrons are registered by a first data acquisition system 200 which may likewise be a TDC, an ADC, or a combination of the two.

The data obtained by the two data acquisition systems 180, 200 may be combined to generate a mass spectrum. The problems of saturation with a single detector are reduced by the arrangement shown in FIGS. 1 and 2, particularly where the grid or mesh 150 has a substantial number of apertures distributed across it. Then, the ions impinging upon the grid or mesh 150 are from or across the width of the ion beam, such that each detector 170, 190 samples ions distributed across the beam.

It is preferable that a significantly larger proportion of ions pass through the grid or mesh 150 than strike it. For example, it is preferable that 90% or more of the ions in the ion beam pass through the mesh or grid 150. This is so that one of the two channels (in the embodiment where there are only two channels) keeps counting (when a TDC is used) even when the other channel is already saturated. In this example, the second DAS 180 will saturate more quickly than the first DAS 200, since the bulk of the particles pass through the mesh or grid 150 to strike the first detector 190.

The fields necessary to extract the electrons towards the first multiplier may lead to TOF aberrations. These may be eliminated by the use of a compensation electrode 210 due to the symmetry of the geometry in the voltages. Ions passing closer to the compensation electrode 210 receive the same TOF aberration as ions passing at the same distance from the entrance of the first multiplier. As a result, the TOF aberrations are almost constant across the whole width of the entrance window into the multiple detector.

Figure 3:
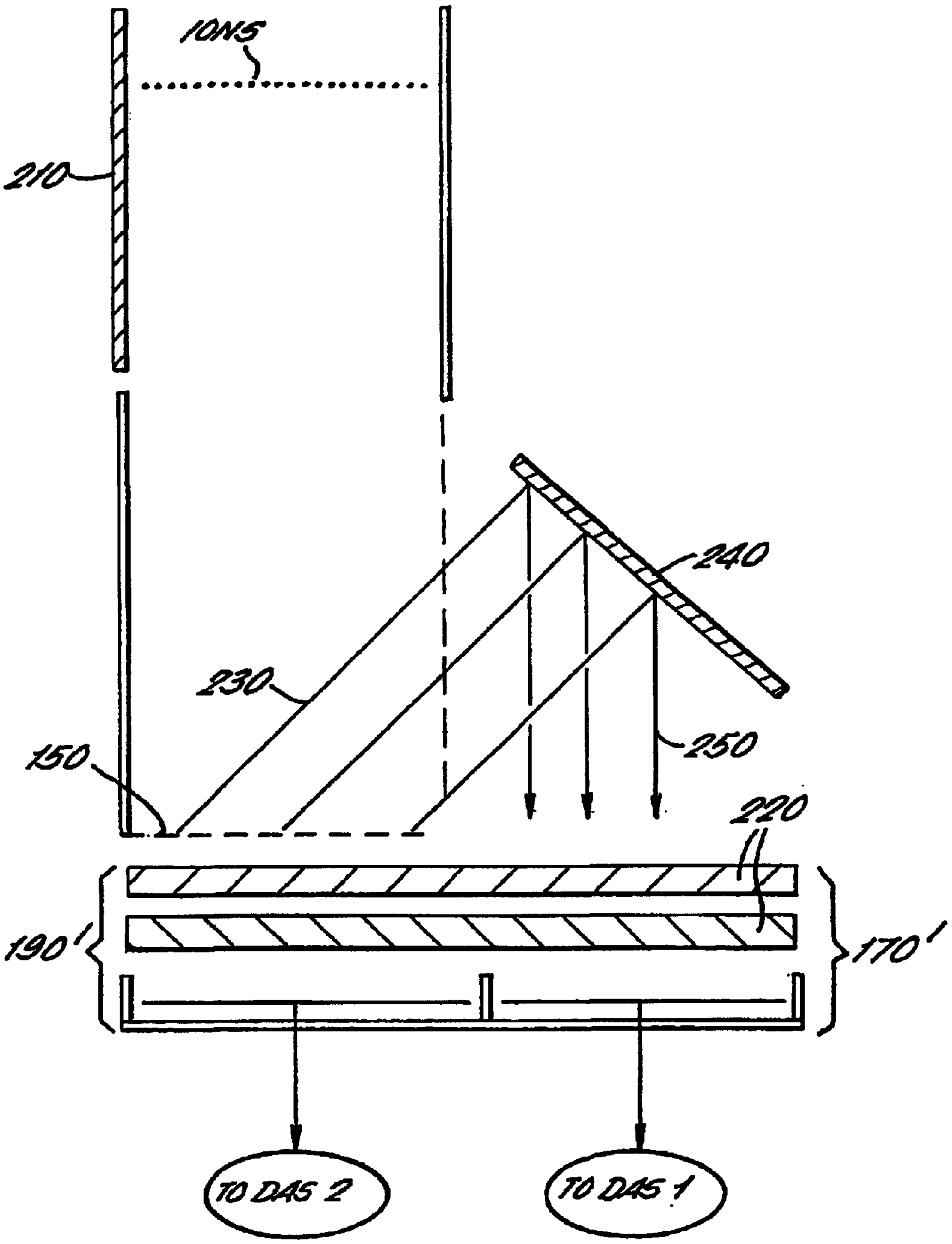
FIG. 3 shows a second embodiment of a multiple detector for a time of flight mass spectrometer.

FIG. 3 shows a second embodiment of a dual detector for use in a TOFMS. Features common to FIGS. 2 and 3 are labelled with like reference numerals.

Instead of separate micro-channel plates arranged orthogonally, as in FIG. 2, the arrangement of FIG. 3 employs distinctly separate and remote areas of a common micro-channel plate assembly 220. As with the arrangement of FIG. 2, ions enter the detector arrangement through a common entrance window and a percentage strike the grid or mesh 150. In the embodiment of FIG. 3, however, those which strike the mesh generate secondary electrons 230 which impinge upon a further electron multiplier 240. The secondary electrons incident upon the further electron multiplier 240 generate tertiary electrons 250 which are directed towards the right-hand side of the common micro-channel plate assembly 220 as seen in FIG. 3. The right-hand part of the common micro-channel plate assembly 220 accordingly forms a part of a first detector 170' which is spatially divided from a second detector 190' as may be seen. Ultimately, the tertiary electrons 250 entering the right-hand side of the common micro-channel plate assembly 220 are registered by a first data acquisition system which, as with FIG. 2, may be a TDC, an ADC or a combination of the two.

Those incident ions which pass through the grid or mesh 150 are incident on the left-hand side of the common micro-channel plate assembly 220 which forms a part of the second detector 190'. In this case, the ions passing through the grid or mesh are ultimately registered by a second data acquisition system, which may be a TDC, an ADC or a combination of the two.

The arrangement of FIGS. 2 and 3 thus separates the incoming ion beam at a much earlier stage than in prior art arrangements; the ion beam is separated as ions rather than as resulting bunches of electrons.

Figure 4:
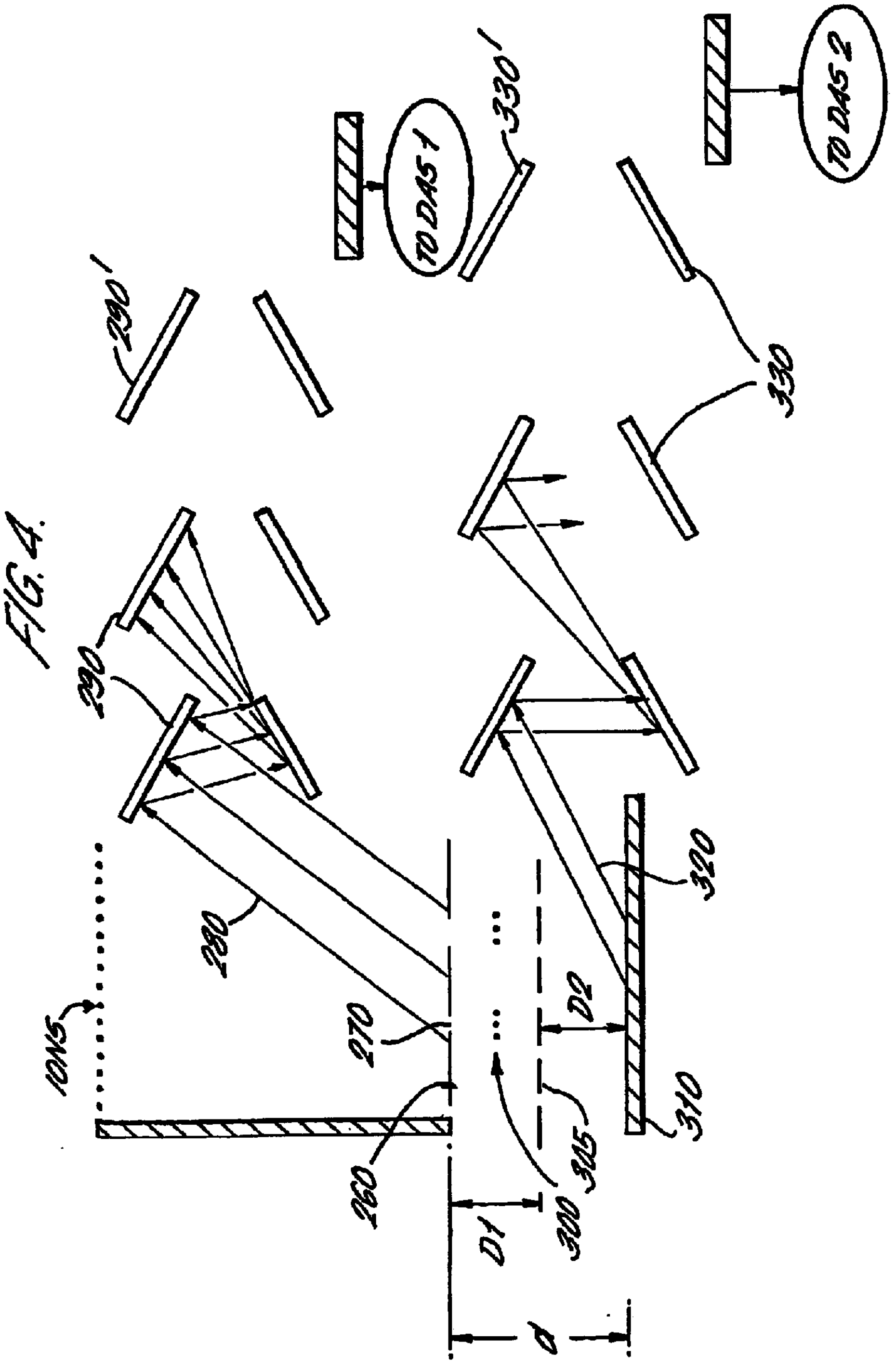
FIG. 4 shows a third embodiment of a multiple detector for a time-of-flight mass spectrometer.

FIG. 4 shows yet another dual detector arrangement embodying the present invention. Here, instead of micro-channel plates, discrete dynodes are instead employed.

As previously, ions enter the dual detector arrangement via a common entrance window. The ions approach a first conversion dynode 260 through which a plurality of apertures 270 are formed (see also FIG. 4). In the embodiment of FIG. 4, the first conversion dynode 260 differs from the grid or mesh 150 of FIGS. 1 to 3 in that the apertures 270 form only a small fraction of the surface area of the first conversion dynode. Thus, the majority of ions incident upon the first conversion dynode 260 are converted into secondary electrons 280 which are in turn incident upon an array of electron multipliers 290 which are preferably arranged in a Chevron format. The electrons generated by the last of the electron multipliers 290' are registered by a first data acquisition system which may as previously be a TDC, an ADC or a combination of the two.

That small fraction of ions 300 which pass through the apertures 270 in the first conversion dynode 260 strike a second conversion dynode 310. As with the grid or mesh 150, the first and second dynodes 260, 310 are formed from stainless steel, nickel, berillium bronze or other suitable materials. Secondary electrons 320 generated by the second conversion dynode 310 are incident upon a first in a further array of electron multipliers 330 which are distinct from the array of electron multipliers 290 that intercept secondary electrons generated by the first conversion dynode 260. The electron multipliers 330 are likewise arranged in a Chevron format and the electrons resulting from the last of the electron multipliers 330' are registered by a second data acquisition system which may include a TDC, an ADC or a combination of the two. The first conversion dynode 160 allows passage of less than 10% of incident ions and is thus different to the mesh or grid 150 of FIGS. 1 to 3 which allows over 90% of ions to pass. The advantage of the conversion dynode over the mesh is that it is easier to manufacture, and that the secondary electrons 280 (which in the arrangement of FIG. 4 represent the bulk of the incident ions) are easier to focus in TOF as they pass towards the electron multipliers 290 than ions are (because electrons are relatively much lighter).

Preferably, the first and second conversion dynodes 260, 310 are both perpendicular to the direction of time of flight dispersion. The incident ions are focussed upon the first conversion dynode 260 and so any that pass through the apertures 270 are subject to an energy spread ϵ which limits the partial mass resolution R in accordance with the formula $$R=\left(\frac{L}{d}\right)\times\left(\frac{1}{\varepsilon}\right)$$

where L is the total effective path length (here, 1.3 meters) and d is the gap between the first and second conversation dynodes 260, 310. For an energy spread of 3% (FWHM) and a required resolution R greater than 15,000, d must be less than 2.7 mm. To address this, the arrangement of FIG. 4 employs a two-stage acceleration as is proposed, for example, by Kulikov et al in Trudy FIAN, vol. 155, (1985) pages 146 to 158. Here, an intermediate grid 305 is employed between the first and second conversion dynodes 260, 310. If an electric field E1 is generated between the first conversion dynode 260 and the intermediate grid 305 (to form a first acceleration stage in a gap of length D1), and a second electric field E2 is generated in the gap D2 between the intermediate grid 305 and the second conversion dynode 310 (forming a second acceleration stage), then for (D1)= 0.2(D2), TOF focussing is achieved when (E2)=0.4(E1). Applying a two-stage acceleration arrangement circumvents the restrictions imposed on d(=D1+D2) by the formula given above and the gap d may be 5 to 10 mm, for example.

Figure 5:
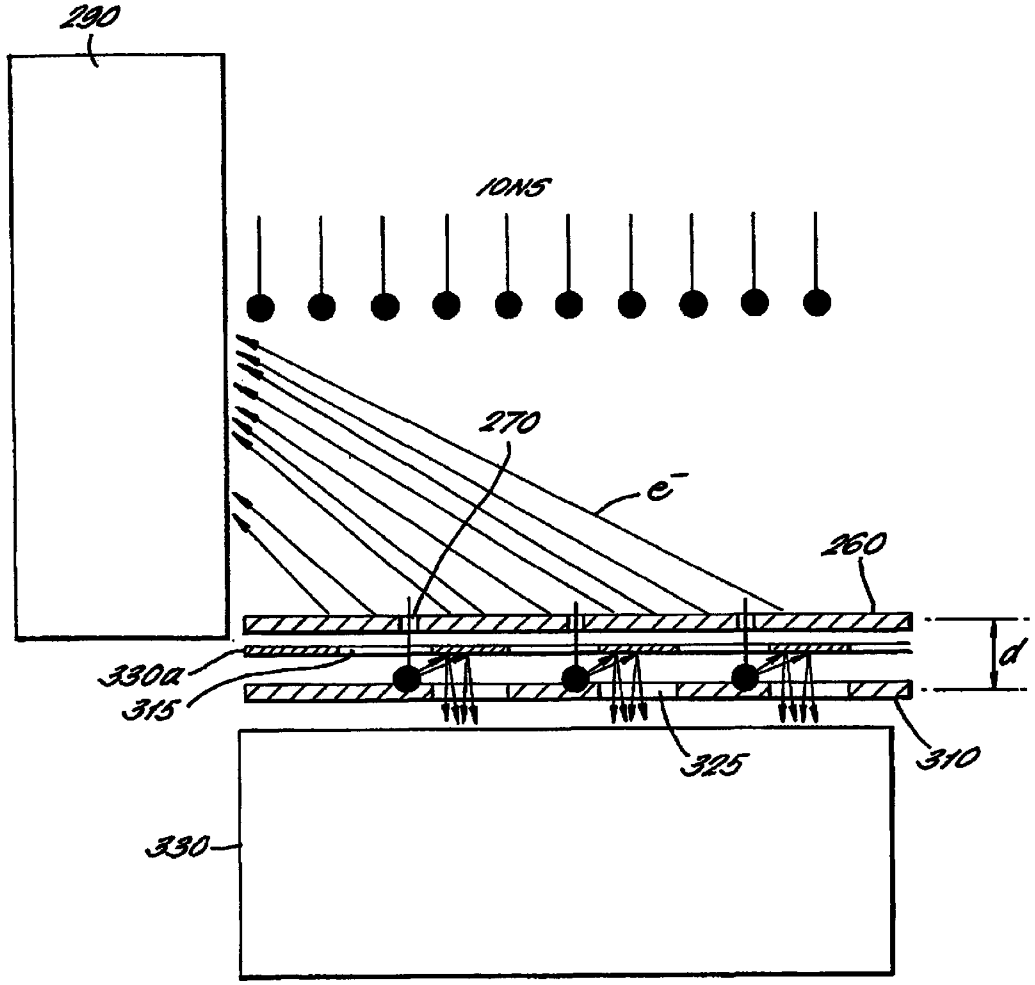
FIG. 5 shows a fourth embodiment of a multiple detector for a time-of-flight mass spectrometer, which is a variation of the third embodiment of FIG. 4.

The alternative to this arrangement is to reduce the distance d, in this case to less than 2.7 mm—in practice a gap of 2.2 mm is preferred. A suitable arrangement is shown in FIG. 5. Here, the electron multipliers 290, 330 are shown simply as blocks for the sake of clarity. However, the first electron multiplier 330*a* of the second set of multipliers 330 is shown. This electron multiplier 330*a* is mounted between the first and second conversion dynodes 260, 310 because of the limited space available due to the constraints on the overall gap d. Ions pass through the apertures 270 in the first conversion dynode 260 and then through further slots 315 in the first electron multiplier 330*a* which are aligned with the apertures 270 in the first conversion dynode 260. The ions then strike the second conversion dynode 310 and secondary electrons generated thereby move back towards the first electron multiplier 330*a*. These secondary electrons strike the material of the first electron multiplier 330*a* between its slots 315 and this in turn generates tertiary electrons. These are directed back towards the second conversion dynode which has further slots 325 that do not align with the slots 315 in the first electron multiplier 330*a*. The tertiary electrons thus pass through the second conversion dynode and into the electron multiplier array 330.

Figure 6:
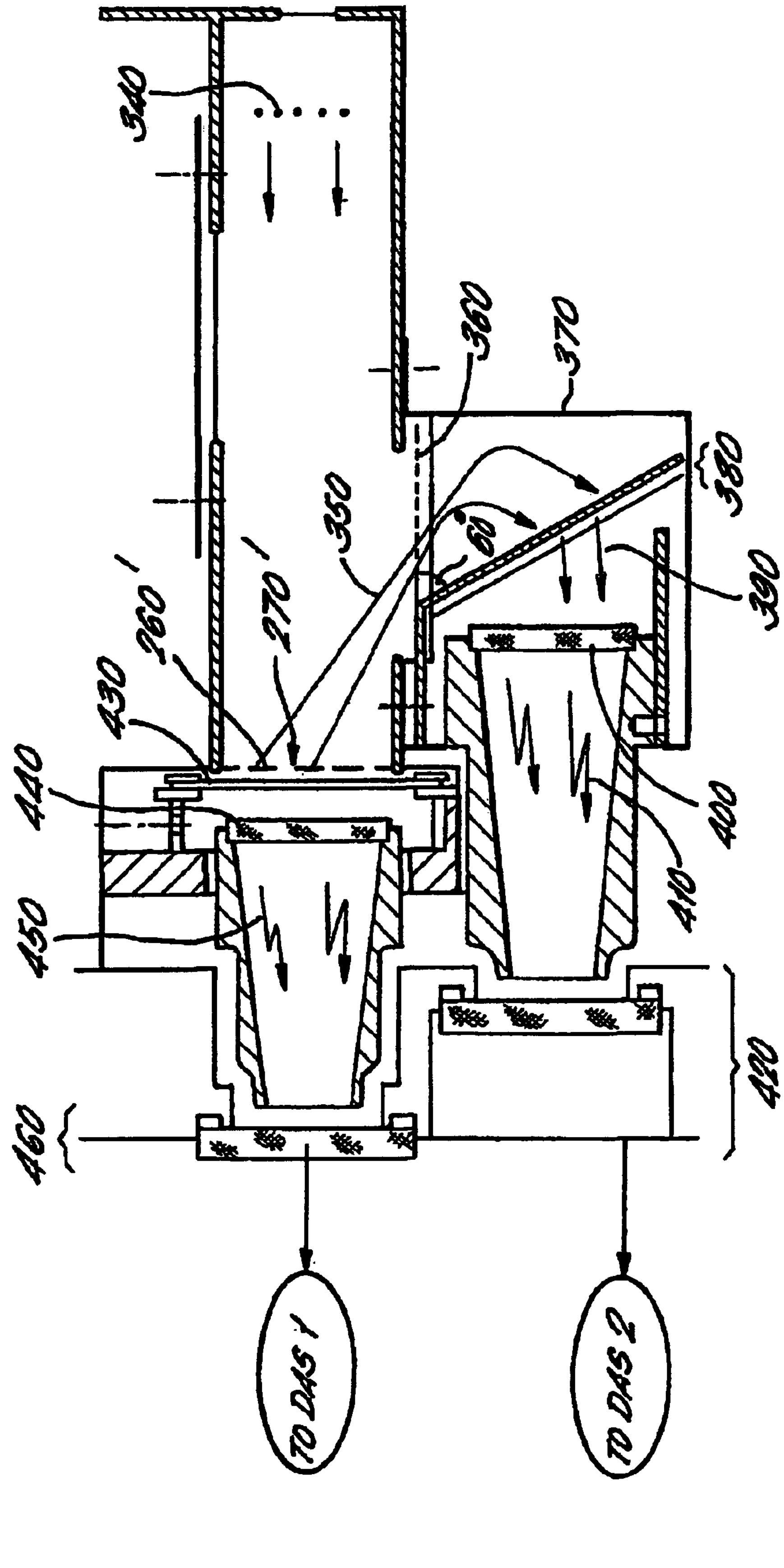
FIG. 6 shows a fifth embodiment of a multiple detector for a time-of-flight mass spectrometer.

Still a further embodiment of a multiple detector is shown in FIG. 6. As with the other embodiments, ions 340 enter the detector arrangement through a common entrance window from the TOFMS. The bulk of the incident ions 340 strike a first conversion dynode 260', similar to the first conversion dynode in the arrangement of FIGS. 4 and 5. Secondary electrons 250 are generated by the first conversion dynode 260' and these are accelerated by an accelerating grid 360 away from the first conversion dynode 260'. The accelerating grid 360 is supplied with a positive potential.

A liner 370 reflects the secondary electron 350 back towards a first micro-channel plate 380 which in turn generates tertiary electrons 390. These strike a first scintillator 400 which, as will be familiar to those skilled in the art, generates photons 410 in response to incident charged particles. The photons 410 are captured by a first photomultiplier 420. The ultimate signal is registered by a first data acquisition system which, as with each of the other embodiments, may be a TDC, an ADC or a combination of the two.

The scintillator may, for example, be formed of barium fluoride or a plastic material such as polyvinyltoluene, with a metallized coating that is less than 50 nm thick. With a barium fluoride scintillator, a photomultiplier having a caesium-tellurium (Cs—Te) photocathode may be employed, whereas with a plastic scintillator, a photomultiplier with a bialkali photocathode is appropriate. If electrons from the back of the microchannel plate 380 are focussed by electric fields onto the first scintillator 400, smaller and cheaper scintillators and photomultipliers can then be used.

It will be noted in FIG. 6 that the first micro-channel plate 380 is canted at an angle of approximately 60° to the direction of TOF separation, that is, at approximately 30° to the first conversion dynode 260'. This arrangement minimises the time of flight separation, although other angles such as 45° may be appropriate.

Those ions 340 which pass through the apertures 270' in the first conversion dynode 260' strike a second microchannel plate 430. Electrons generated by the micro-channel plate 430 cause a second scintillator 440 to generate photons 450 which are detected by a second photo-multiplier 460. A second data acquisition system, once again comprising a TDC, an ADC or a combination of the two, registers the photons arriving at the second photo-multiplier 460. The second scintillator, photomultiplier and microchannel plate may be formed of similar materials to the first ones.

There are a number of ways of focussing photons from the first and second scintillators 400, 440 onto the first and second photomultipliers 420, 460 respectively. If the photomultiplier is large enough, no focussing is necessary. For smaller photomultipliers, a conical light guide may be used with a polished (e.g. aluminium) inside surface, either in vacuo or at atmosphere (with a fused silica window acting as a vacuum seal). Alternatively, a short-focus lens can be employed, which may act as a vacuum seal if the photomultiplier is kept at atmosphere.

The advantage of the arrangement of FIG. 6 over other embodiments described herein is that there is complete galvanic isolation from the noise of power supplies, switching voltages and so forth. The collectors of the photomultipliers 420, 460 can also be kept at virtual ground which simplifies the preamplifier to which it is connected and also reduces its noise. Instead of the chevron arrangement preferred for other embodiments, the microchannel plates 380, 430 in FIG. 6 can be single stage. The photomultipliers 420, 460 are very sensitive (almost single photon) and a single stage plate provides adequate gain.

Although not shown in FIG. 6, it is desirable that the ion entrance window to the arrangement of this embodiment has a compensation electrode similar to the compensation electrode 210 of FIGS. 1 to 3, and for the same purpose (to minimize ion TOF spread).

Although each of the detectors shown in FIGS. 1 to 5 is a dual detector, it is to be appreciated that three or more detectors can be employed instead. Likewise, it will be understood that an orthogonal TOFMS is shown in FIG. 1 simply for the purposes of illustration. Longitudinal TOFMS is equally suited to the multiple detector arrangement described herein. Indeed, the arrangement is also applicable to other forms of mass spectrometry such as quadrupole mass spectrometry, where one employs two counters rather than a counter and an ADC.

What is claimed is:

1. An ion detection arrangement for a time-of-flight mass spectrometer comprising:

an ion beam splitter arranged to block the onward passage of a first part of an incident bunch of ions which has passed through the time-of-flight mass spectrometer, but to allow passage of a second part of that incident bunch of ions;

a first detector means arranged to detect ions whose passage has been blocked by the ion beam splitter; and a second detector means arranged to detect those ions which pass through the said ion beam splitter.

2. The ion detection arrangement of claim 1, in which the ion beam splitter is arranged to generate secondary electrons when ions in the said first part of the ion bunch strike it, whereby the ion beam splitter forms a part of the first detector means.

3. The ion detection arrangement of claim 1, in which the first detector means further comprises one or more electron multipliers.

4. The ion detection arrangement of claim 1, in which the second detector means further comprises one or more electron multipliers.

5. The ion detection arrangement of claim 3, in which at least one of the electron multipliers is a micro-channel plate electron multiplier.

6. The ion detection arrangement of claim 3, in which at least one of the electron multipliers is a discrete dynode electron multiplier.

7. The ion detection arrangement of claim 3, in which at least one of the electron multipliers includes a scintillator and a photo-multiplier.

8. The ion detector of claim 1, in which the first and second detectors each contain a single electron multiplier, the plane of the said first electron multiplier being orthogonal to the plane of the said second electron multiplier.

9. The ion detection arrangement of claim 1, further comprising a micro-channel plate assembly which forms a part of both the first and second detector means, wherein:

a first part of the micro-channel plate assembly is arranged to collect ions that pass, in use, through the ion beam splitter; and wherein:

a second part of the micro-channel plate is arranged to collect secondary electrons resulting from those ions that are incident upon the ion beam splitter.

10. The ion detector arrangement of claim 1, further comprising a microchannel plate assembly which forms a part of both the first and the second detector means; wherein:

a first part of the microchannel plate assembly is arranged to collect secondary electrons produced from ions that pass through the said ion beam splitter, and wherein:

a second part of the microchannel plate is arranged to collect secondary electrons resulting from those ions that are incident upon the ion beam splitter.

11. The ion detection arrangement of claim 10, wherein the second part of the microchannel plate is arranged to collect secondary electrons resulting directly from those ions that are incident upon the ion beam splitter.

12. The ion detection arrangement of claim 10, wherein the second part of the microchannel plate is arranged to collect secondary electrons resulting indirectly from those ions that are incident upon the ion beam splitter.

13. The ion detection arrangement of claim 1, in which each of the first and second detector means comprises a plurality of electron multipliers each formed from a discrete dynode, and wherein at least some of the discrete dynodes in the first and second detector means are arranged as a chevron.

14. The ion detection arrangement of claim 1, in which the ion beam splitter is arranged as a flat plate having a plurality of apertures.

15. The ion detection arrangement of claim 14, in which the plane of the flat plate is substantially orthogonal to the direction of TOF dispersion of the ion bunches arriving at the said ion beam splitter.

16. The ion detection arrangement of claim 14, in which the ion beam splitter is so arranged that the probability of interception of incident ions thereby is at least one order of magnitude different to the probability of passage of ions therethrough.

17. The ion detection arrangement of claim 14, in which the ion beam splitter is a transparent mesh arrangement to generate secondary electrons when ions are incident thereon, the majority of incident ions passing in use through the holes in the mesh.

18. The ion detection arrangement of claim 14, in which the ion beam splitter is a conversion dynode formed with a series of apertures through which a minority of incident ions pass in use, the majority of incident ions being intercepted by the conversion dynode and converted thereby into secondary electrons in use.

19. The ion detection arrangement of claim 1, further comprising a compensation electrode orthogonal to and upstream of the ion beam splitter.

20. The ion detection arrangement of claim 1, in which the first detector means and the second detector means each further comprises a data acquisition system.

21. The ion detection arrangement of claim 20, in which at least one of the data acquisition systems includes a time to digital detector.

22. The ion detector arrangement of claim 20, in which at least one of the data acquisition systems includes an analogue to digital converter detector.

23. The ion detection arrangement of claim 4, in which at least one of the electron multipliers is a microchannel plate electron multiplier.

24. The ion detection arrangement of claim 4, in which at least one of the electron multipliers is a discrete dynode electrode multiplier.

25. The ion detection arrangement of claim 4, in which at least one of the electron multiples includes a scintillator and a photo-multiplier.

26. A method of detecting the time of flight of ions in an ion beam of a time-of-flight mass spectrometer, comprising:

directing ions to be detected through the time-of-flight mass spectrometer and toward an ion beam splitter;

blocking passage of a first portion of the ions in the ion beam at the ion beam splitter;

allowing passage of a second portion of the ions in the ion beam through the ion beam splitter;

detecting ions whose passage has been blocked by the ion beam splitter with a first detector means; and detecting ions passing through the ion beam splitter with a second detector means.

27. The method of claim 26, further comprising generating secondary electrons as a consequence of incidence of ions upon the ion beam splitter, and detecting the secondary electrons with the first detector means.

28. An ion detection arrangement for detecting bunches of ions in a time of flight mass spectrometer, comprising:

an ion beam splitter arranged downstream of the time of flight mass spectrometer and in the path of the bunches of ions, the ion beam splitter defining a plurality of apertures distributed across the width of the incident ion bunches;

a first detector arranged to detect ions which have been passed through the time of flight mass spectrometer and which then strike the ion beam splitter; and a second detector arranged to detect ions which have passed through the time of flight mass spectrometer and which have also passed through the plurality of apertures defined by the ion beam splitter.

29. The ion detection arrangement of claim 28, wherein the ion beam splitter is a substantially transparent mesh, whereby the majority of ions in each bunch that passes through the time of flight mass spectrometer also pass through the apertures in the mesh and only a minority of the ions from the time of flight mass spectrometer strike the mesh structure.

30. The ion detection arrangement of claim 28, wherein the mesh is so configured that at least 90% of the ions arriving at the mesh from the line of flight mass spectrometer pass through the apertures therein.

31. The ion detection arrangement of claim 28, wherein the ion beam splitter is a plate defining a plurality of apertures, and wherein the relative dimensions of the plate and the aperture defined therein are such as to permit passage of only a minority of the ions from the time of flight mass spectrometer through the said apertures, to the second detector, the majority of the said ions from the time of flight mass spectrometer striking the plate.

* * * * *

UNITED STATES PATENT AND TRADEMARK OFFICE

CERTIFICATE OF CORRECTION

PATENT NO. : 6,940,066 B2
APPLICATION NO. : 10/478927
DATED : September 6, 2005
INVENTOR(S) : Makarov et al.

It is certified that error appears in the above-identified patent and that said Letters Patent is hereby corrected as shown below:

In the claims:
Column 12, claim 30, line 22
The word “line” should be replaced with --time--

Signed and Sealed this

Fifth Day of June, 2007

JON W. DUDAS
*Director of the United States Patent and Trademark Office*